United States Patent [19]

Sy et al.

[11] Patent Number: 4,476,029

[45] Date of Patent: Oct. 9, 1984

[54] HIGH TEMPERATURE DISPERSANT

[75] Inventors: Anita O. Sy, Columbia, Md.; Dionisio G. Cuisia, Chicago, Ill.

[73] Assignees: W. R. Grace & Co., New York, N.Y.; Dearborn Chemical Co., Chicago, Ill.

[21] Appl. No.: 382,164

[22] Filed: May 26, 1982

[51] Int. Cl.$^3$ ................................................ C09K 7/02
[52] U.S. Cl. ..................................................... 252/8.5 C
[58] Field of Search ........................... 252/8.5 A, 8.5 C

[56] References Cited

U.S. PATENT DOCUMENTS

| | | | |
|---|---|---|---|
| 2,552,775 | 5/1951 | Fischer et al. | 252/8.5 C |
| 3,123,559 | 3/1964 | Fischer | 252/8.5 C |
| 3,730,900 | 5/1973 | Perricone et al. | 252/8.5 C |
| 3,764,530 | 10/1973 | Burland et al. | 252/8.5 C |

OTHER PUBLICATIONS

Technical Data–Oil Services Division, Bulletin OSD 1012, pub. by Allied Colloids Inc.

*Primary Examiner*—Herbert B. Guynn
*Attorney, Agent, or Firm*—Edward J. Cabic

[57] ABSTRACT

Improved dispersants are disclosed for water-based bentonite clay drilling fluids containing a waterloss controller and a weighting agent. The dispersant can be a polyacrylic acid having a molecular weight of from about 700 to about 50,000 and preferably about 4,000 to about 8,000 or it can be used in combination with a sulfonated polystyrene-maleic anhydride copolymer. The dispersants are able to be used at temperatures from about 70° F. up to 500° F.

7 Claims, 5 Drawing Figures

FCLS

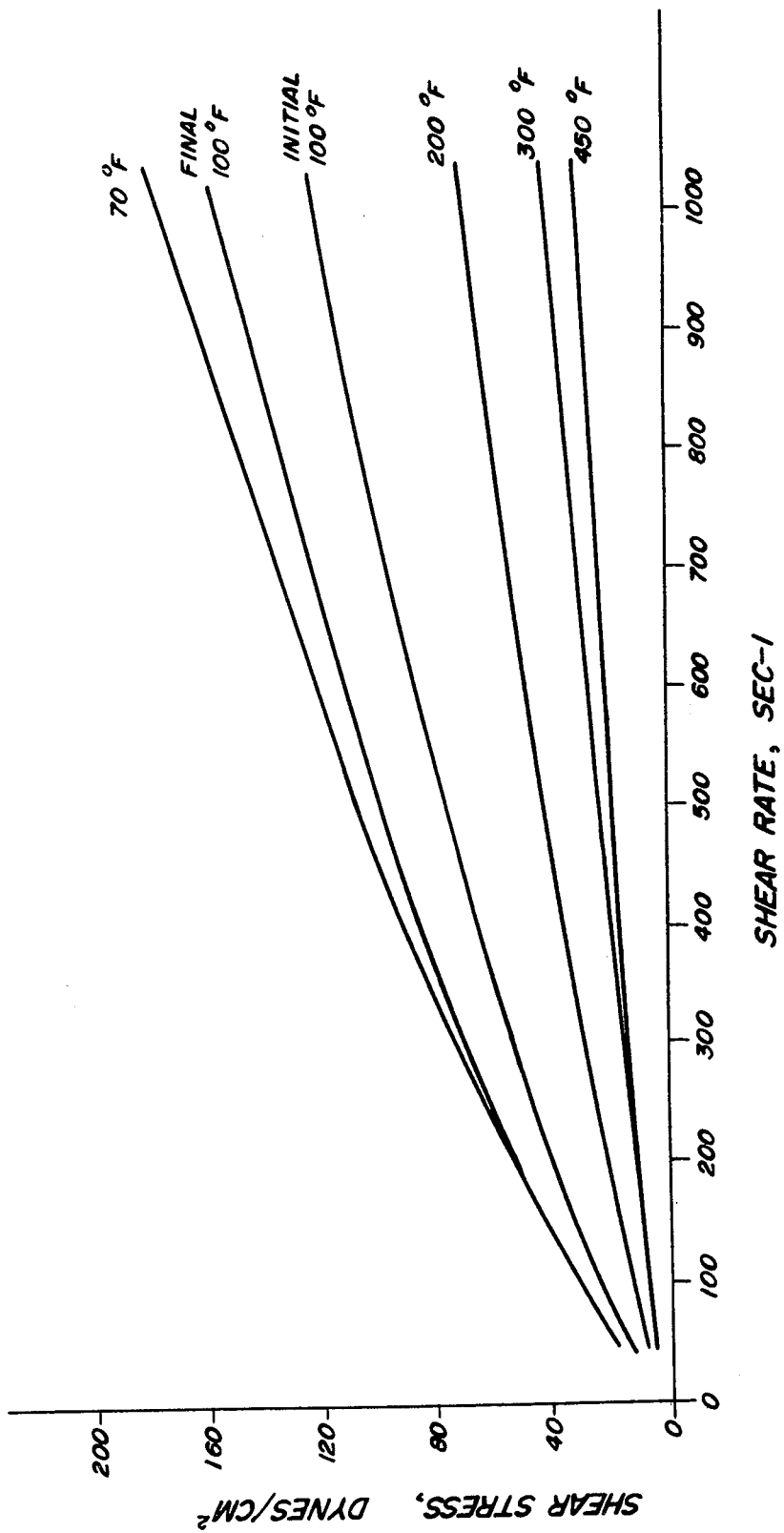

HIGH TEMPERATURE DISPERSANT

BACKGROUND OF THE INVENTION

1. Field of the Invention

This invention relates to a dispersant for drilling fluids or muds which can be used at high temperatures.

2. Description of the Previous Drilling Fluids

Clay slurries such as water-based bentonite clay slurries are used as drilling fluids. To disperse the solid materials, a dispersant such as ferrochrome lignosulfonate (FCLS) has been used. However, when these FCLS containing slurries are used at higher temperatures such as above 250° F., FCLS breaks down and the drilling fluid gels.

Another dispersant system which has been used with drilling fluids is a combination of the FCLS and Mil-Temp which is a sulfonated polystyrene maleic anhydride copolymer made by Milchem, a subsidiary of Baker International. This system requires two components, it requires the renewed maintenance of the FCLS and it is more expensive than just FCLS in view of the higher cost of the added Mil-Temp.

3. Objects of the Invention

It is an object of this invention to obtain a dispersant for water-based drilling fluids which remains operable even at high temperatures such as up to 450° F.

It is a further object of this invention to obtain a drilling fluid with a dispersant which remains operable at high temperatures.

It is a further object of this invention to be able to drill down into an earth formation at significant depths where the drilling temperatures are high such as above 350° F. by using a water-based clay drilling fluid having a dispersant which remains stable at this higher temperature.

These and further objects will become apparent as the description of the invention proceeds.

SUMMARY OF THE INVENTION

A dispersant has been found which can be used in water-based weighted mud systems at ambient temperature and especially at higher temperatures encountered in deep wells to maintain mud rheological properties. This dispersant is a polyacrylic acid which has a molecular weight of from about 700 to about 50,000. An especially preferred form is a polyacrylic acid with a molecular weight of from about 4,000 to about 8,000. This polyacrylic acid is available in an aqueous mixture form from Dearborn Chemical Company, U.S. and is referred to herein as Sample A. The weight of this acid material used herein is on a solids basis. This material has been used with bentonite clays and passed a severe test where the mixture was aged at 500° F. for 18 hours and then upon subsequent heating to 450° F. for 1 hour in a Fann 50 C viscometer, it still maintained satisfactory rheological properties. An acceptable dispersant can also be made by adding to the polyacrylic acid a sulfonated polystyrene maleic anhydride copolymer having a molecular weight of about 3000 to about 5,000. This combination product is available in an aqueous mixture form from Dearborn Chemical Company, U.S. and it is referred to herein as Sample B. Again, the weight basis for this mixture is on a solids basis.

By using this polyacrylic acid dispersant, a cost-effective dispersant system for use in water-based high-temperature applications is obtained. When used with the proper waterloss controller it will permit operators to postpone having to switch to an oil-based mud which is often used when drilling deep, hot wells. In contrast to most commercial dispersants which begin to lose their effectiveness at about 250° F., the present polyacrylic acid dispersant remains stable and effective up to temperatures of 450° F. when tested for a period of at least one hour.

It is a further aspect of this invention to be able to drill deep, hot wells in earth formations by using a water-based weighted mud system which contains as the dispersant a polyacrylic acid having a molecular weight which ranges from about 700 to about 50,000 and more preferably from about 4,000 to about 8,000.

BRIEF DESCRIPTION OF THE DRAWINGS

FIG. 5 is a graph of the shear stress versus shear rate at various temperatures for a clay composition further containing the preferred dispersant according to the present invention.

DESCRIPTION OF THE PREFERRED EMBODIMENTS

Water-based drilling fluids can be very effectively dispersed by using as the dispersant a polyacrylic acid. The polyacrylic acid can be used in a molecular weight range of from about 700 to about 50,000 and in an especially preferred molecular weight range of from about 4,000 to about 8,000. This preferred material is available from Dearborn Chemical Company, U.S. as is referred to herein as Sample A. This dispersant works very well under ordinary temperatures as well as at high temperatures and it has been shown to have good compatibility with such common mud additives as the weighting agent barite and contaminants as Rev Dust, Glen Rose Shale, and Dolomite. It is also compatible with conventional waterloss controllers.

The polyacrylic acid can be added in an amount on a solids basis of from about 0.5 pounds per barrel when dispersing an unloaded clay up to about 10 pounds per barrel.

In addition to just using the polyacrylic acid alone, it is also possible to use a blend of this polyacrylic acid and a sulfonated polystyrene maleic anhydride copolymer having a molecular weight of about 3,000 to about 5,000. This blend is sold by Dearborn Chemical Company, U.S. and it is referred to herein as Sample B.

The conventional clay slurry is made of bentonite clay. This clay can be used in the form of a high yield or a medium yield or a mixture of the two. The term yield used here defines the quality of a clay by describing the number of barrels of a given centipoise slurry that can be made from a ton of the clay. Based on the yield, clays are classified as bentonite, high-yield, low yield, etc. types of clays. See API RP 13B for the test procedures.

Other components which can be added to the drilling fluid are weighting agents such as barite, waterloss controllers, such as Cypan made by American Cyanamid, possible viscosifying agents and other conventional drilling fluid additives.

The resulting drilling fluid has suitable rheological properties of viscosity and non-Newtonian, pseudoplasticity, that is to say, that the viscosity of the resultant water-based drilling fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; and n is a numerical value of from 0 to 1.

Figure 1:
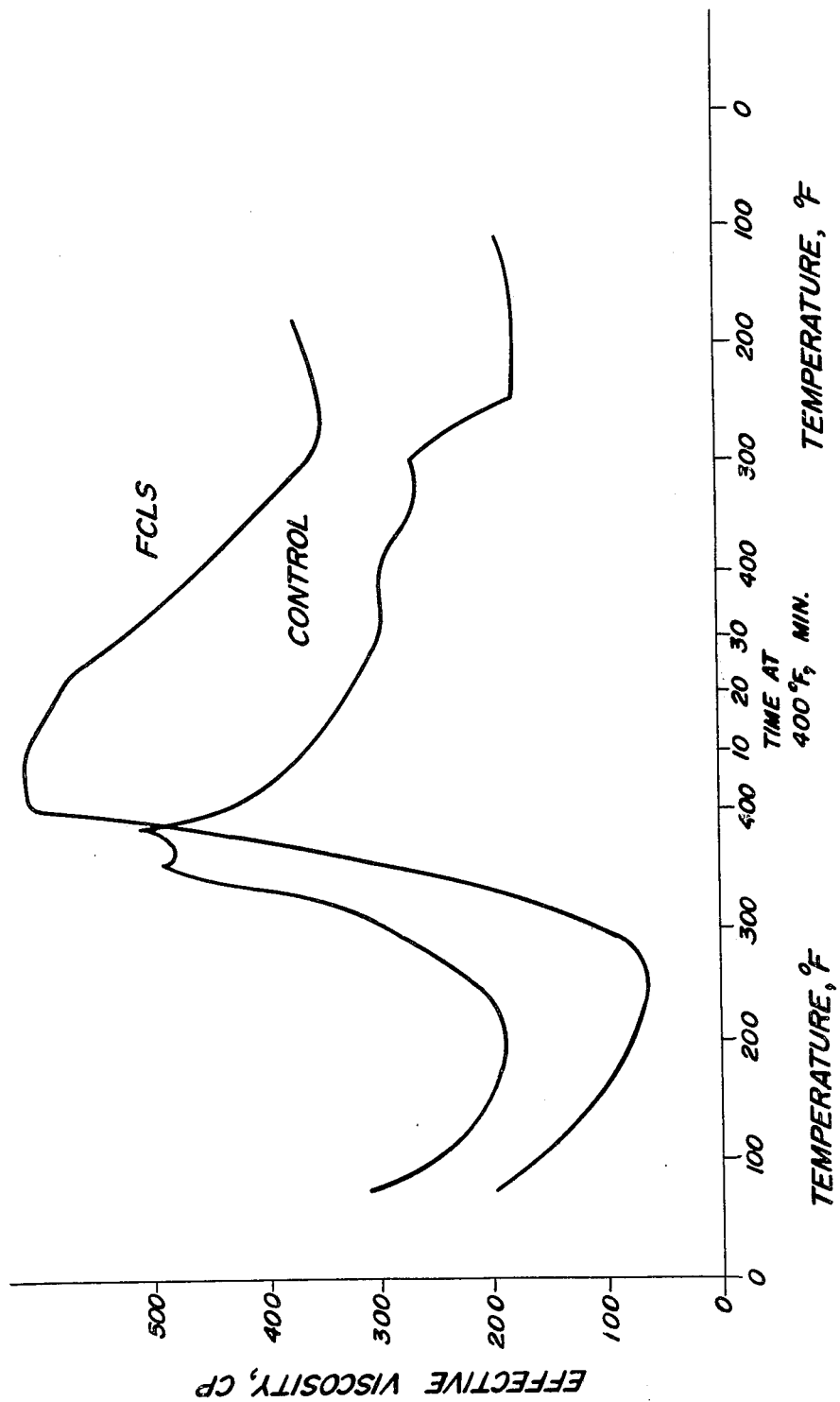
FIG. 1 is a graph of effective viscosity on the ordinate versus temperature on the abscissa for the control which is a water slurry of bentonite clay and for the clay system with FCLS added as the dispersant. In the middle of the abscissa is the change in viscosity over time at 400° F.

The rheological problems with water-based bentonite clay systems at higher temperatures are illustrated in the figures. FIG. 1 is a graph of the effective viscosity at 100 rpms measured on a Fann 50 C viscometer versus temperature for the control bentonite clay and for the common dispersant ferrochrome lignosulfonate, FCLS. The graph is arranged to first show the effective viscosity at 100 rpm on the ordinate as the temperature is increased to 400° F. on the abscissa. Next the graph shows the change in effective viscosity over time as the sample is maintained at 400° F. for 30 minutes with the time period being expressed on the abscissa. Then the graph shows the change in effective viscosity as the temperature is decreased on the abscissa. For the control bentonite clay as the temperature is raised above 200° F. the effective viscosity increases indicating that the material is gelling and not exhibiting the desired shear thinning properties at the elevated temperature. Similarly for the FCLS, as the temperature increases above 200° F. the effective viscosity of the material increases which again indicates that the FCLS dispersant is not acting as a proper dispersant with acceptable rheological properties. During aging at 400° F. the effective viscosity remains approximately constant and then the effective viscosity falls off as the temperature decreases as in the control.

Figure 2:
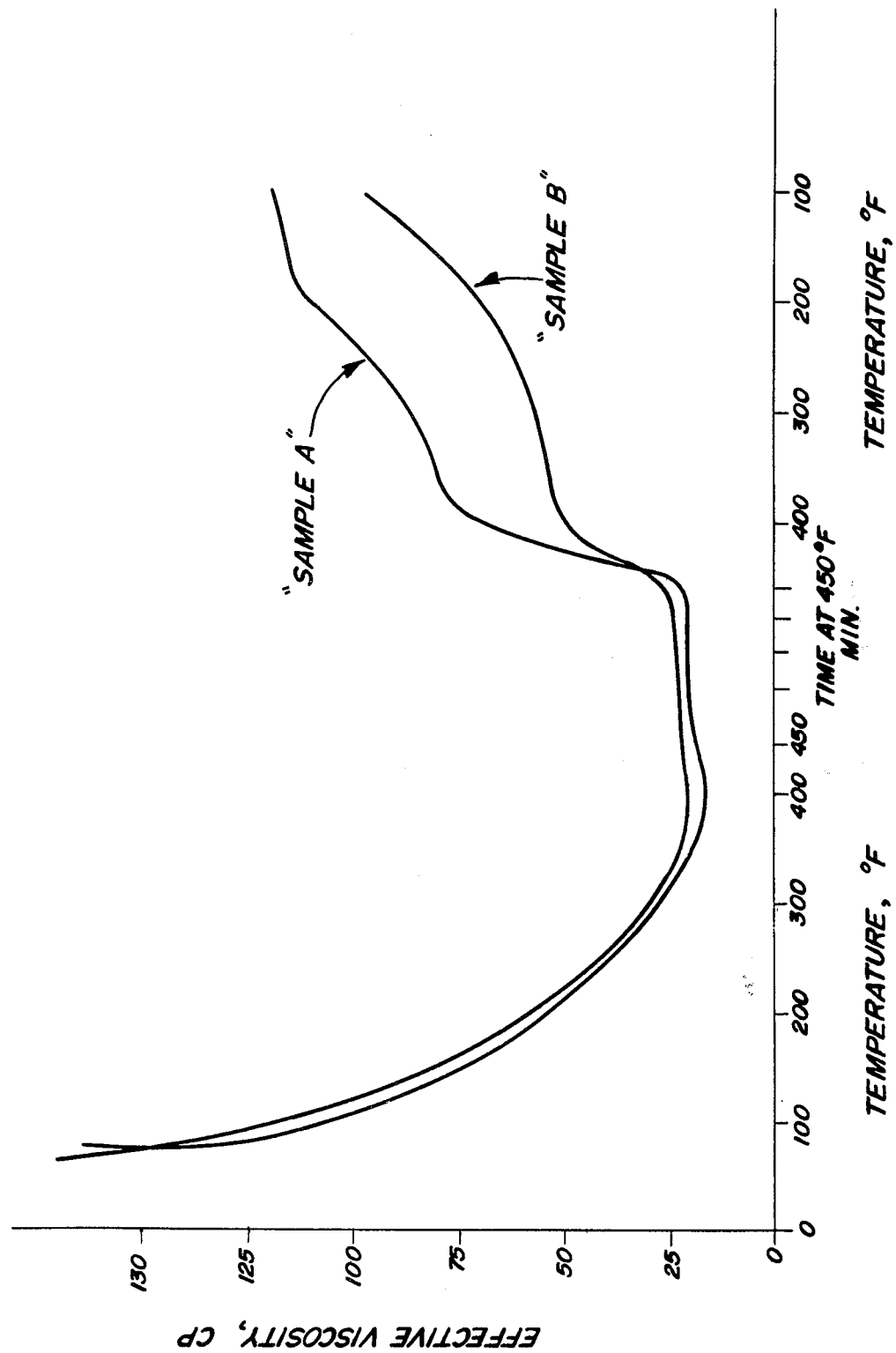
FIG. 2 is a graph of effective viscosity on the ordinate versus temperature on the abscissa for the bentonite clay system with the preferred dispersant according the the present invention. In the middle of the abscissa is the change in viscosity over time at 450° F.

FIG. 2 is a graph of the effective viscosity at 100 rpms measured on a Fann 50 C viscometer versus various temperatures and a holding time period as described with regard to FIG. 1. The curve labeled "Sample A" contains 35 pounds per barrel of bentonite (13 pounds high yield and 22 pounds medium yield) to which has been added 2 pounds per barrel of the polyacrylic acid identified above as Sample A. The curve labeled "Sample B" contains the same amount and type of bentonite clay to which has been added 2 pounds per barrel of the polyacrylic acid containing material identified above as Sample B. Both materials were aged at 500° F. for 18 hours and then run on the Fann 50 C viscometer under the conditions listed on the abscissa. Note that as the temperature increases along the abscissa the apparent viscosity for both samples decreases until the temperature of 450° F. is reached. Then the materials are maintained at that temperature for over an hour and the viscosity remains generally constant showing that the materials are not breaking down. Then as the materials are allowed to cool back down to a temperature of about 100° F. both materials return back partially to their original condition with the higher viscosity. As shown by the graph, "Sample A" has a higher rebound curve. The ability of both materials to return to higher viscosities upon cooling demonstrates that these materials are able to maintain their good rheological properties and that they are stable and do not break down at the high temperatures.

Figure 3:
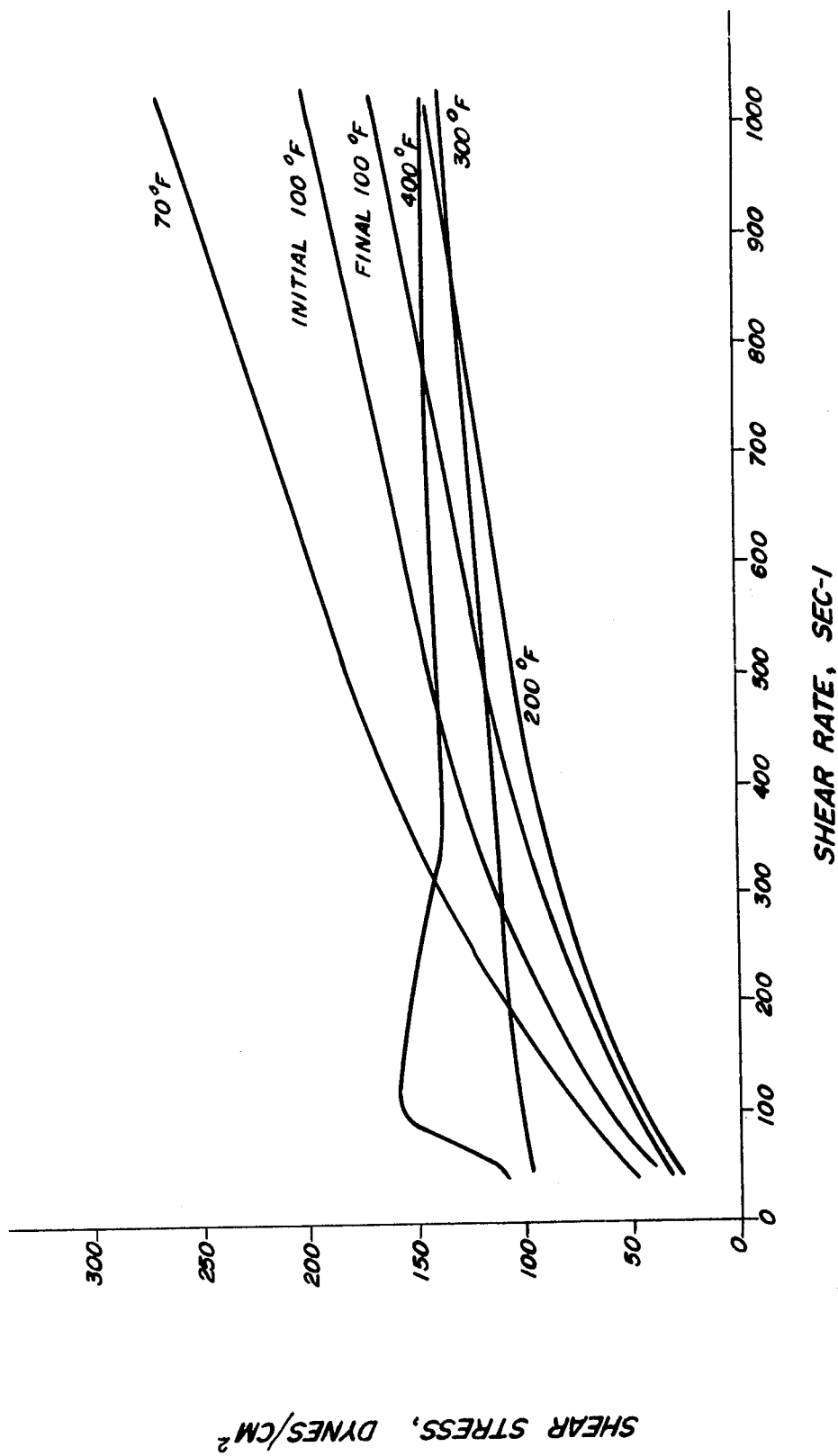
FIG. 3 is a graph of the shear stress versus shear rate at various temperatures for a composition containing just the control water based slurry of bentonite clay.

FIG. 3 illustrates the shear stress versus the shear rate relationship at various temperatures for the control bentonite clay. From 70° F. through to 200° F. the curves follow a common, regular pattern showing a decrease in shear stress as the temperature increases. However, once the temperature reaches 300° F. the shear stress undesirably increases at the lower shear rates and when the sample is heated to 400° F. the curve is unlike the shape of any of the previous curves. This indicates that the clay alone does not maintain good rheological properties at these higher temperatures.

Figure 4:
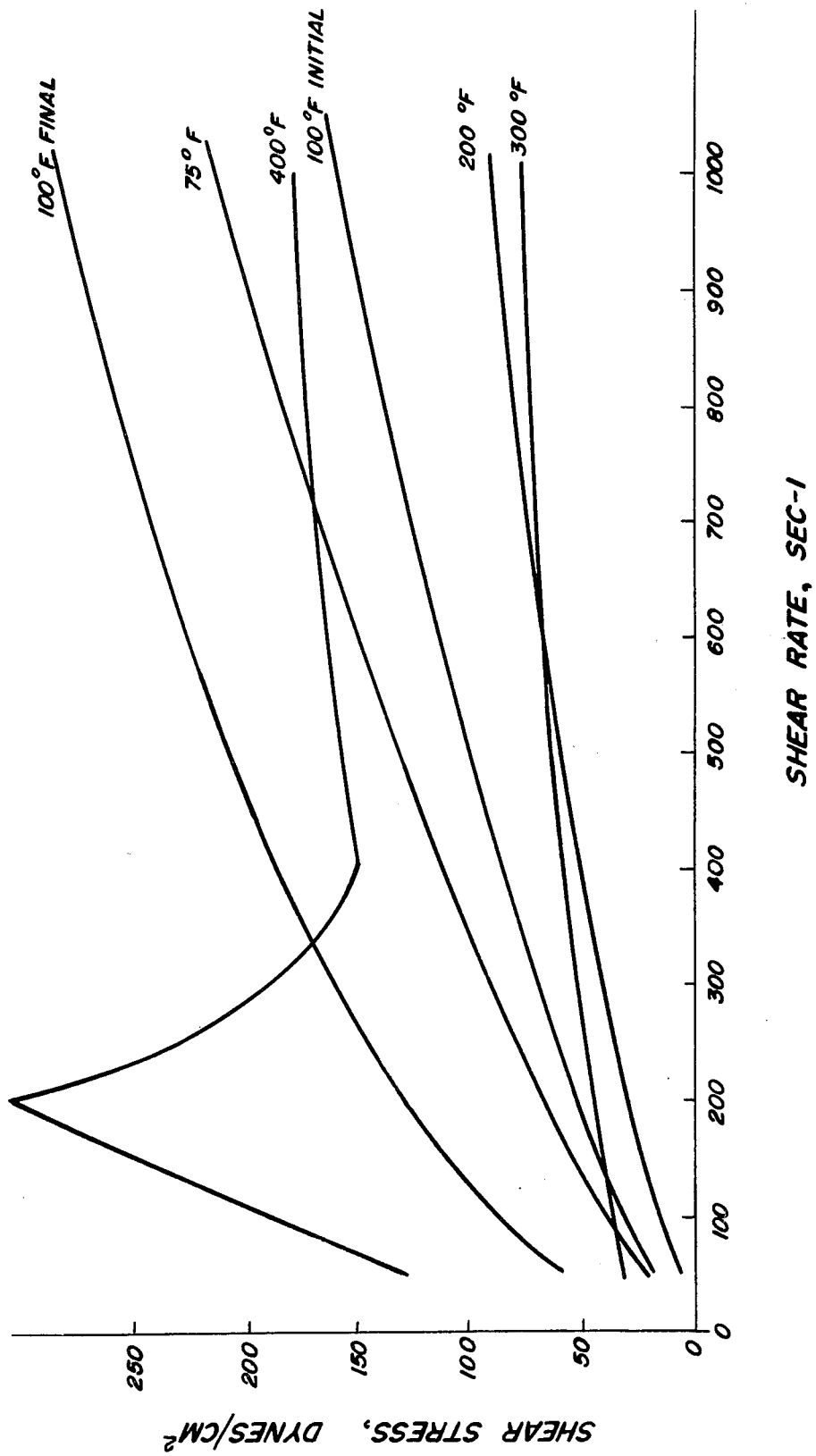
FIG. 4 is a graph of the shear stress versus shear rate at various temperatures for a clay composition further containing FCLS as the dispersant.

FIG. 4 illustrates the shear stress versus the shear rate relationship at various temperatures for FCLS at a concentration of 2 pounds per barrel. Again, from 70° F. through 200° F. the curves follow a common, regular pattern showing a decrease in shear stress as the temperature decreases. As the temperature reaches 300° F. there is a slight increase in the shear stress at the low shear rate and at 400° F. there is a very undesirable increase in the shear stress at low shear rates. This shows that the FCLS has broken down at these higher temperatures.

FIG. 5 illustrates the shear stress versus the shear rate relationship for the preferred polyacrylic acid dispersant according to the present invention, Sample A, at a concentration of 2 pounds per barrel. These smooth curves show the material retains its power law relationship upon heating initially from 70° F. up through 100° F. and then up to 450° F. Upon a cooling back to a final temperature of 100° F., the power law relation is still maintained.

Having described the basic aspects of my invention the following examples are given to illustrate specific embodiments thereof.

TEST PROCEDURES

The terms K and n are used in the rheological power law model. The constant K is the value of the shear stress at a shear rate of 1 sec$^{-1}$ and it is expressed in units of pounds per 100 square feet. It is measured by extrapolating the straight line of the log of the shear stress versus the log of the shear rate between 10 and 100 sec$^{-1}$ back to a value of 1 sec$^{-1}$. The exponent n is determined by measuring the slope of the curve when plotting the log of the shear stress versus the log of the shear rate between 10 and 100 sec$^{-1}$.

The apparent viscosity, app. vis., is measured by taking the Fann viscometer reading at 600-rpm and dividing it by 2.

The plastic viscosity, PV, is a measure of the internal resistance to fluid flow attributable to the amount, type, and size of solids present in a given fluid. The value, expressed in centipoises, is proportional to the slope of the consistency curve determined in the region of laminar flow for materials obeying Bingham's Law of Plastic Flow. When using the direct-indicating viscometer, the plastic viscosity is found by subtracting the 300 rpm reading corresponding to a shear rate of 511 sec$^{-1}$ from the 600 rpm reading corresponding to a shear rate of 1021 sec$^{-1}$.

The yield point, YP, also known as the yield value is the resistance to initial flow, or represents the stress required to start fluid movement. This resistance is due to electrical charges located on or near the surfaces of the particles. The values of the yield point and thixotropy, respectively, are measurements of the same fluid properties under dynamic and static states. The Bingham yield value, reported in lb./100 sq. ft., is determined by the direct-indicating viscometer by subtracting the plastic viscosity from the 300 rpm reading.

The gel strength is the ability or the measure of the ability of a colloid to form gels as a function of time or thixotropy. Gel strength is a pressure unit usually reported in lb./100 sq. ft. It is a measure of the same interparticle forces of a fluid as determined by the yield point except that gel strength is measured under static conditions, yield point under dynamic conditions. The common gel-strength measurements are initial and the 10 min. gels. The measured initial gel strength of a fluid is the maximum reading (deflection) taken from a direct-reading viscometer after the fluid has been quiescent for 10 sec. It is reported in lb./100 sq. ft. The details of the test procedure as set forth in API RP 13B. The measured 10-min. gel strength of a fluid is the maximum reading (deflection) taken from a direct-reading viscometer after the fluid has been quiescent for 10 min. The reading is reported in lb./100 sq. ft.

The filtration rate was determined using a Baroid high pressure high temperature filter tester with a pressure receiver. The pressure differential was 500 p.s.i. and the temperature was 350° F. The rate is measured on the basis of the milliliters collected in 30 minutes and the ml reading is multiplied by 2 per the API standard.

EXAMPLE 1

This example illustrates the dispersant properties of two dispersants according to the present invention in an unweighted clay system when compared to a control sample.

In each run 35 pounds per barrel of bentonite was used which consisted of 13 pounds of high yield and 22 pounds of medium yield bentonite clay. Run A was the control. Runs B and C employed Sample A and Sample B according to the present invention. All samples were aged at 500° F. for 18 hours. The samples were then cooled and run on a Haake RV-1 viscometer at 80° C. The viscosity data is set forth in Table 1.

TABLE 1

| Run | Dispersant (lb. per barrel) | K lb. per 100 ft$^2$ | n | app. vis. cp | PV cp | YP lb. per 100 ft$^2$ |
|---|---|---|---|---|---|---|
| 1A | none | 24.4 | 0.21 | 67.0 | 28.0 | 78.0 |
| 1B | Sample A (0.76) | 0.42 | 0.74 | 32.6 | 17.9 | 29.3 |

TABLE 1-continued

| Run | Dispersant (lb. per barrel) | K lb. per 100 ft$^2$ | n | app. vis. cp | PV cp | YP lb. per 100 ft$^2$ |
|---|---|---|---|---|---|---|
| 1C | Sample B (0.5) | 1.83 | 0.59 | 47.7 | 32.9 | 29.5 |

The lower apparent viscosity and yield point for Runs B and C illustrates the remaining dispersant effect of these dispersants even after this high temperature treatment.

EXAMPLE 2

This example illustrates the compatibility of the preferred dispersant according to the present invention with contaminants such as Rev Dust, Glen Rose Shale, and Dolomite.

Run 2A serves as a control in which no dispersant or additive is used. Run 2B is also a control where just the dispersant is used but with no additive. Then Runs 2C, 2D and 2E employ the preferred dispersant along with the contaminant type additives Rev Dust, Glen Rose Shale and Dolomite. In all the runs the bentonite clay was added in an amount of 35 pounds per barrel consisting of 13 pounds of high yield and 22 pounds of medium yield bentonite clay. All the mixtures were aged at 400° F. for 18 hours. The mixtures were cooled and run in a Fann 35 A viscometer at 70° F. The viscosity data is set forth in Table 2.

TABLE 2

| Run | Dispersant (lb. per barrel) | Additive (lb. per barrel) | K lb. per 100 ft$^2$ | n | app. vis. cp | PV cp | YP lb. per 100 ft$^2$ | gel strength lb. per 100 ft$^2$ 10 sec/10 min |
|---|---|---|---|---|---|---|---|---|
| 2A | 0 | 0 | 9.8 | 0.46 | 113 | 60 | 105 | 15.0/16.0 |
| 2B | Sample A (2) | 0 | 1.2 | 0.67 | 61.3 | 45.5 | 31.5 | 5.0/6.0 |
| 2C | Sample A (2) | Rev Dust (30) | 2.10 | 0.62 | 79.0 | 56.5 | 45.0 | 6.0/10.0 |
| 2D | Sample A (2) | Glen Rose Shale (25) | 3.2 | 0.58 | 92.5 | 63.5 | 58.0 | 8.0/11.0 |
| 2E | Sample A (2) | Dolomite (25) | 1.4 | 0.69 | 74.5 | 55.0 | 39.0 | 7.0/8.0 |

From a comparison of controls 2A and 2B it is again seen that by adding the dispersant, the apparent viscosity decreases which shows that the dispersant is continuing to work at high temperatures. Then as the various contaminants are added, the viscosity increases. However, with the dispersant present, the apparent viscosities are still below the 113 cp of the unloaded control 2A.

EXAMPLE 3

This example illustrates the compatability of the preferred dispersant with the weighting agent barite.

Run 3A is the control with the barite added and no dispersant. In Run 3B the preferred dispersant according to the present invention was added. In both cases the bentonite was added in an amount of 35 pounds per barrel which consisted of 13 pounds of high yield and 22 pounds of medium yield bentonite clay. Barite was added to increase the mud weight up to a level of 15 pounds per gallon. The mixtures were aged at 350° F. for 18 hours. The mixtures were cooled and then run on the Fann 35A at 70° F. The viscosity data is given in Table 3.

TABLE 3

| Run | Dispersant (lb. per barrel) | app. vis. cp | PV cp | YP lb. per 100 ft² | Gel Strength lb. per 100 ft² 10 sec/10 min |
|---|---|---|---|---|---|
| 3A | none | 255 | 108.0 | 294.0 | 40/71 |
| 3B | Sample A (10) | 109.5 | 74.0 | 71.0 | 19/31 |

By using the preferred dispersant according to the present invention, the apparant viscosity is reduced in half.

EXAMPLE 4

This example presents a comparison between the preferred dispersants according to the present invention and other dispersants when used in an unweighted water-based bentonite clay system that has been subjected to high temperature aging.

Run 4A serves as a control in which no dispersant is used. Runs 4B and 4C use the prior art FCLS and Mil-Temp while Runs 4D and 4E use the preferred dispersants according to the present invention. In all the runs the bentonite clay was added in an amount of 35 pounds per barrel consisting of 13 pounds of high yield and 22 pounds of medium yield bentonite clay. All the mixtures were aged at 500° F. for 18 hours. The mixtures were cooled and run in a Fann 35 A viscometer at 70° F. The viscosity data is set forth in Table 4.

TABLE 4

| Run | Dispersant (lb. per barrel) | K lb. per 100 ft² | n | app. vis. cp | PV cp | YP lb. per 100 ft² | Gel Strength lb. per 100 ft² 10 sec/10 min |
|---|---|---|---|---|---|---|---|
| 4A | none | 9.8 | 0.46 | 113 | 60 | 105 | 15.0/16.0 |
| 4B | FCLS (2) | 2.5 | 0.62 | 94 | 61 | 65 | 5.0/5.0 |
| 4C | Mil-Temp (2) | 10.4 | 0.44 | 117 | 58 | 118 | 17.0/17.0 |
| 4D | Sample A (2) | 2.1 | 0.62 | 76 | 53 | 46 | 8.0/9.0 |
| 4E | Sample B (2) | 2.1 | 0.65 | 81 | 58 | 46 | 7.0/8.0 |

For the Mil-Temp (Run 4C) the apparent viscosity and yield point values are higher than the control (Run 4A) indicating that this material has failed as a dispersant at this high temperature. The FCLS (Run 4B) also has a fairly high apparent viscosity. Its viscosity and yield point are clearly higher than the values for the preferred dispersants according to the present invention as set forth in Runs D and E.

EXAMPLE 5

This example illustrates the compatability of the preferred dispersant with a commercially available waterloss controller both before and after aging.

A mixture was made with 15 pounds per barrel of high yield bentonite clay, 4 pounds per barrel of the preferred dispersant, Sample A, on a solids basis, 3 pounds per barrel of the waterloss controller Cypan sold by American Cyanamid, 30 pounds per barrel of Rev Dust and it was weighted with barite to a level of 15 pounds per gallon. The rheology for this initial mixture is measured in Run 5A. The mixture was then aged for 48 hours at 350° F. and the rheology of the aged mixture is set forth as Run 5B in Table 5.

TABLE 5

| Run | K lb. per 100 ft² | n | app. vis. cp | PV lb. per 100 ft² | YP lb. per 100 ft² | Gel Strength lb. per 100 ft² 10 sec/10 min | Filtration Rate ml/30 min. |
|---|---|---|---|---|---|---|---|
| 5A | 2.0 | 0.65 | 85.0 | 71 | 28 | 7.0/10.5 | 24.2 |
| 5B | 0.98 | 0.70 | 57.5 | 49 | 17 | 7.0/8.0 | 17.2 |

The filtration rate of the initial mixture is within an acceptable range which shows the composition performs as a waterloss controller. After the high temperature aging, the material has an even better filtration rate. Most of the other rheological properties also improve with aging which again demonstrates that ability of the preferred dispersant to withstand high temperature use.

It is understood that the foregoing detailed description is given merely by way of illustration and many variations may be made therein without departing from the spirit of this invention.

What is claimed is:

1. In a water-based bentonite clay drilling fluid containing a waterloss controller, a weighting agent, and a dispersant, the improvement wherein the dispersant is a high temperature dispersant comprising a polyacrylic acid having a molecular weight of from about 4,000 to about 8,000.

2. A drilling fluid according to claim 1, wherein the dispersant is added in an amount of from about 0.5 pounds per barrel to about 10 pounds per barrel.

3. A drilling fluid according to claim 1, wherein the dispersant further comprises a sulfonated polystyrene-maleic anhydride copolymer having a molecular weight of from about 3,000 to about 5,000.

4. A process of drilling a well in an earth formation comprising circulating in said well while drilling a water-based bentonite clay drilling fluid containing a waterloss control agent, a weighting agent and a dispersant which comprises a polyacrylic acid having molecular weight of from about 4,000 to about 8,000.

5. A process according to claim 4, wherein the drilling fluid further comprises a sulfonated polystryene maleic anhydride copolymer having a molecular weight of from about 3,000 to about 5,000.

6. A process according to claim 4, wherein the temperature in the earth formation is at a temperature of from about 70° F. to about 500° F.

7. A process according to claim 4, wherein the dispersant is added in an amount of from about 0.5 pounds per barrel to about 10 pounds per barrel.

* * * * *